(12) United States Patent
Dressel (10) Patent No.: US 9,361,566 B2
(45) Date of Patent: Jun. 7, 2016

(54) METHOD FOR READING AN RFID TOKEN, RFID CARD AND ELECTRONIC DEVICE

(75) Inventor: Olaf Dressel, Wustermark (DE)

(73) Assignee: Bundesdruckerei GmbH, Berlin (DE)

( * ) Notice: Subject to any disclaimer, the term of this patent is extended or adjusted under 35 U.S.C. 154(b) by 527 days.

(21) Appl. No.: 13/825,671

(22) PCT Filed: Aug. 17, 2011

(86) PCT No.: PCT/EP2011/064183
§ 371 (c)(1),
(2), (4) Date: Apr. 17, 2013

(87) PCT Pub. No.: WO2012/041595
PCT Pub. Date: Apr. 5, 2012

(65) Prior Publication Data
US 2013/0194075 A1 Aug. 1, 2013

(30) Foreign Application Priority Data
Sep. 30, 2010 (DE) .......................... 10 2010 041 745

(51) Int. Cl.
*H04Q 3/00* (2006.01)
*G06K 19/07* (2006.01)
*G06K 7/00* (2006.01)

(52) U.S. Cl.
CPC .......... *G06K 19/0723* (2013.01); *G06K 7/0008* (2013.01)

(58) Field of Classification Search
USPC .............................................. 340/10.1–10.5
See application file for complete search history.

(56) References Cited

U.S. PATENT DOCUMENTS

| 2006/0279413 | A1 | 12/2006 | Yeager |
| 2007/0155430 | A1* | 7/2007 | Cheon ............... H04M 1/72527 455/558 |
| 2011/0065385 | A1* | 3/2011 | Geslin ............... G06K 7/10237 455/41.1 |
| 2011/0234379 | A1* | 9/2011 | Lee ................... H04M 1/72519 340/10.1 |

FOREIGN PATENT DOCUMENTS

| DE | 10 2008 000 067 | 7/2009 |
| WO | WO 2006/103510 | 10/2006 |
| WO | WO2009089943 | 7/2009 |

* cited by examiner

*Primary Examiner* — Ojiako Nwugo
(74) *Attorney, Agent, or Firm* — Leveque Intellectual Property Law, P.C.

(57) ABSTRACT

The invention relates to a method for reading an RFID token (106), having the following steps:
converting an RFID read command (184) into a memory card command (192) by means of an electronic device (100, 101), which has an integrated memory card reader (182),
transmitting the memory card command to an RFID card (107) by means of the memory card reader, wherein the RFID card contains a memory card interface (187) for the memory card reader and an RFID reader (188, 189, 190) that can be addressed via the memory card interface,
sending the RFID read command (184) contained in the memory card command (192) from the RFID reader to the RFID token by means of an RFID read signal,
receiving an RFID response (193) from the RFID token by means of the RFID reader,
transmitting the RFID response (193) to the memory card reader of the electronic device via the memory card interface.

15 Claims, 9 Drawing Sheets

METHOD FOR READING AN RFID TOKEN, RFID CARD AND ELECTRONIC DEVICE

The invention relates to a method for reading an RFID token, to an RFID card and to an electronic device, in particular a portable, battery-operated electronic device.

Various methods for reading RFID tokens are known from the prior art, for example for payment functions, in particular "electronic ticketing", access control systems or for authentication purposes, in particular government applications.

RFID-token-based authentication methods are disclosed in DE 10 2008 000 67 A1, EP 2 041 729 B1 and in patent application DE 10 2009 001 959.6-31, which belongs to the same applicant and was unpublished on the application date, these documents being fully incorporated hereby into the disclosure of the present patent application.

A memory card having a memory card interface and an RFID function unit for receiving radio frequency signals is known per se from DE 20 2006 020 843 U1.

By contrast, the object of the invention is to create an improved method for reading an RFID token as well as to create a corresponding RFID card and an electronic device for such an RFID card.

The objects on which the invention is based are each achieved by the features of the independent patent claims. Embodiments of the invention are disclosed in the dependent claims.

According to embodiments of the invention, a method for reading an RFID token is created, wherein an RFID read command for read access to the RFID token is converted into a memory card command. This may occur such that a store command to store the RFID read command on a memory card is generated on the basis of the RFID read command. Instead of a memory card however, an RFID card with a memory card interface is located in a memory card reader of the electronic device. The store command is executed by the RFID card as a result of the RFID read command contained in the store command being sent in the form of an RFID read signal to the RFID token.

The RFID read command can be generated by the electronic device itself, in particular by an application program of the electronic device, or by an external device, for example a first computer system, which can be coupled to the electronic device via a communication connection.

According to embodiments of the invention, the RFID read command is converted into the memory card command by the electronic device, for example by a driver program for the memory card interface, wherein the driver program can be integrated into the operating system of the electronic device. This is particularly advantageous since a virtual RFID interface for receiving RFID read commands is thus created by the memory card interface in combination with the driver program. The electronic device can thus be used for RFID communication with an RFID token, even though the electronic device does not contain an RFID reader.

The user can thus access an electronic device already in his possession having no RFID interface in order to communicate with an RFID token by introducing an RFID card according to the invention into the memory card reader of the electronic device instead of a conventional memory card and by installing the corresponding driver software to convert RFID read commands into memory card commands on the electronic device.

The RFID token may be a document for example, in particular a value document or a security document.

In accordance with the invention, a "document" is understood to mean paper-based and/or plastic-based documents, such as identification documents, in particular passports, identification cards, visas and driver's licenses, vehicle registration certificates, vehicle registration documents, corporate identification cards, health cards or other ID documents and also smart cards, payment means, in particular bank notes, bankers' cards and credit cards, waybills or other credentials, into which a data memory for storing information, in particular at least one attribute, and an RFID interface for RFID communication with an RFID reader are integrated.

In this case, "RFID communication" is understood to mean any communication method in a radio frequency range, wherein carrier waves of the frequencies 125 KHz, 134 KHz or 13.56 MHz can be used for example. In particular, the RFID communication can be carried out in accordance with standard ISO/IEC 14443.

In particular, the RFID read command can thus be formed as what is known as an application protocol data unit (APDU), and the RFID response of the RFID token can be formed as what is known as a response APDU.

In this case, a "memory card reader" is preferably understood to mean a card reader integrated into the electronic device for accessing electronic memory cards, in particular what are known as secure digital (SD) memory cards. Such SD memory cards exist as standard in various formats, memory capacities, with various file systems and access speeds, such as SD high capacity memory cards, SD extended capacity (SDXC), MiniSD, and Micro SD.

According to embodiments of the invention, the electronic device has at least one printed circuit, for example what is known as a printed circuit board, which at least partially covers the memory card reader, integrated into the housing, of the device. In particular, the memory card reader may be assembled on the printed circuit board.

So as to still ensure a sufficiently strong radiation of the RFID read command and the receipt of the RFID response by the RFID card in the memory card reader, the RFID antenna of the RFID card has a directional lobe that is directed away from the printed circuit board. By way of example, the directional lobe of the RFID antenna may be oriented in the direction of insertion of the RFID card into the memory card reader.

According to an embodiment of the invention, the RFID response is buffered by the RFID card and is read out by the memory card reader as a result of a subsequent read command of the electronic device. This has the advantage that the memory card interface of the electronic device can also be used to read the RFID response.

According to an embodiment of the invention, the receipt and/or the storage of the RFID response by the RFID card is signaled to the electronic device via the memory card interface, for example in the form of a bus signal via the data bus via which the memory card interfaces of the RFID cards and of the electronic device communicate with one another. On the basis of this signalization, the driver program of the electronic device then generates the memory card read command for reading the RFID response from the memory of the RFID card.

Alternatively, the memory card read command is generated by the driver after a predetermined period of time. To this end, a timer, which for example is started with the output of the RFID read command and which runs out after a predetermined period of time that is sufficiently long to send the RFID read command and to receive and store the RFID response thereto by the RFID card, can be provided in the electronic device.

According to an embodiment of the invention, the same memory area of the RFID card is used as a buffer memory for sending RFID read commands and for receiving RFID responses thereto. The buffer memory is then always read at the latest before a further RFID read command is output by the electronic device to the RFID card so as to prevent overwriting of the RFID response and therefore a data loss as a result of the subsequent RFID read command.

According to an embodiment of the invention, a cryptographic protocol for reading at least one attribute from the RFID token is executed, wherein the APDUs required for this purpose are preferably transmitted to the RFID card with the aid of memory card commands and the corresponding response APDUs are received by the electronic device with the aid of memory card read commands. In particular, a method claimed in DE 10 2008 000 67 B4 can be carried out in this manner.

According to a further embodiment, the invention relates to a method for reading at least one attribute stored in the RFID token, wherein the RFID token is associated with a user, and wherein the RFID token has an RFID interface, said method comprising the following further steps: authenticating the user to the RFID token, establishing a communication connection, in particular a mobile communication connection, between the electronic device, which in particular may be embodied as a mobile communication device, and a first computer system, wherein the electronic device has a second interface that contains the memory card interface, establishing a protected connection via the communication connection and via the first and second interfaces between the first computer system and the RFID token, authenticating the first computer system to the RFID token via the protected connection, granting the first computer system read access to the at least one attribute stored in the RFID token, following successful authentication of the user and of the first computer system to the RFID token, in order to transmit the at least one attribute via a network once said attribute has been signed, wherein, to implement the read access, one or more RFID read commands is/are generated by the first computer system and/or the electronic device.

In a further aspect the invention relates to an RFID card having a memory card interface for a memory card reader of an electronic device and having a memory card housing, in which the memory card interface and an RFID reader that can be address via the memory card interface are integrated, and having a processor for controlling an RFID interface of the RFID card to send an RFID read command on the basis of the receipt of a memory card command, wherein the memory card command is preferably a command to store an RFID read command.

In this case, an RFID card is understood in particular to mean any smart card that has a memory card housing, for example an SD memory card housing, with a corresponding memory card interface. Either instead of an electronic data memory or in addition thereto, the RFID card contains an RFID reader, which can be addressed by a memory card reader via the memory card interface.

In a further aspect the invention relates to an electronic device, in particular a portable, battery-operated electronic device, such as a mobile phone, a laptop computer, an electronic camera, a smartphone, in particular an iPhone or iPad, or another electronic appliance or a computer system, such as a PC, with an integrated memory card reader for an RFID card according to the invention. The electronic device preferably has a driver program, which may be part of the operating system and by means of which a virtual RFID interface, via which an application program can communicate with the RFID token via the RFID card, is formed in combination with the memory card reader of the electronic device.

According to an embodiment of the invention, the RFID reader of the RFID card is formed as a base smart card reader (Cat B), more specifically for example in accordance with the technical guideline BSI TR-03119, Version 1.1 "Requirements of Smart Card Readers with ePA Support".

Embodiments of the invention will be explained in greater detail hereinafter with reference to the drawings, in which.

Corresponding elements in the subsequent embodiments are denoted by like reference signs.

Figure 1:
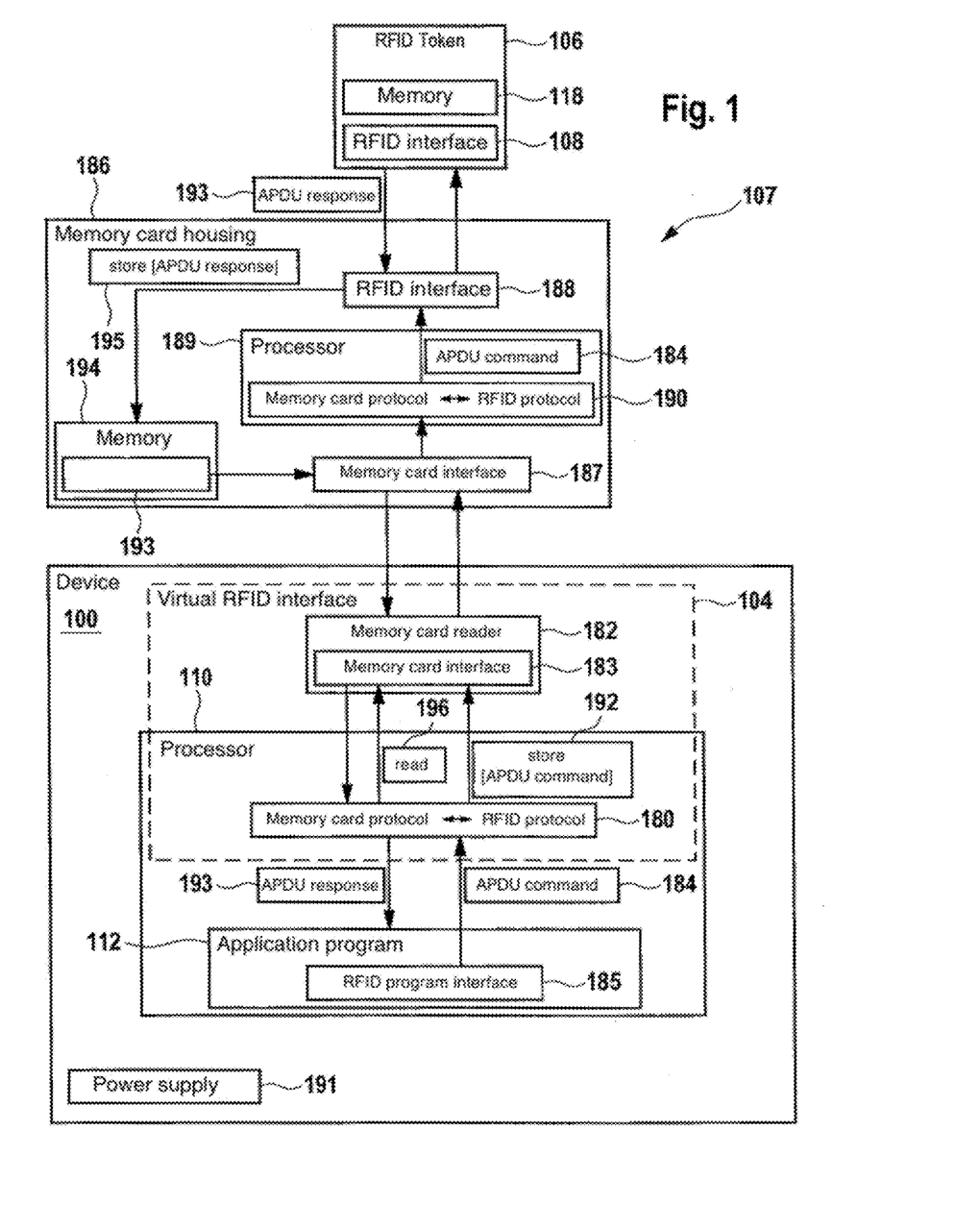
FIG. 1 shows a block diagram of an RFID system according to the invention.

FIG. 1 shows an electronic device, which may be a portable, battery-operated device for example; the electronic device may be a personal computer, a portable computer, such as a laptop or palmtop computer, a personal digital assistant, a mobile telecommunication device, in particular a smartphone, an electronic appliance or the like. The electronic device will be referred to hereinafter as a user computer system 100, although this is in no way limiting.

The user computer system 100 has an interface 104, which is formed as a virtual RFID interface for communication with an RFID token 106 via an RFID card 107.

The user computer system 100 has at least one processor 110 for executing a driver program 180, which may be part of an operating system of the user computer system 100. The user computer system 100 also has an integrated memory card reader 182 with a memory card interface 183 for receiving a memory card, such as an SD memory card. The driver program 180 contains a conversion routine for converting an RFID protocol into a memory card protocol and vice versa, either alternatively or additionally to the standardized functions of a driver for a memory card reader. It is thus made possible for the user computer system 100 to access the RFID card 107 via the memory card interface 183 in order to send an RFID read command 184 to the RFID token 106.

The RFID read command 184 may be formed for example as what is known as a command APDU. The RFID read command 184 may be generated by the execution of program instructions 112, which form an application program, wherein the application program has an RFID programming interface, for example what is known as an application programming interface. Alternatively, the RFID read command 184 from the user computer system 100 may be received by an ID provider computer system 136 via a network 116 for example (see FIG. 6).

The RFID card 107 has a memory card housing 186, which may be extremely identical to a standardized SD memory card housing. The memory card housing 186 carries a memory card interface 187 with electrical contacts for contacting the memory card interface 183 of the memory card reader 182. The memory card interface 187 may in turn be formed as with a conventional SD memory card with regard to the embodiment of the electrical contacts and the voltage level used.

In contrast to a conventional memory card, the RFID card 107 contains an RFID interface 188 for communication with a corresponding RFID interface 108 of the RFID token 106. The RFID card 107 further has a processor 189 for executing a program 190, by means of which the RFID interface 188 is controlled. The program 190 is used in particular to convert the memory card protocol into the RFID protocol and vice versa.

An RFID reader, which enables information, such as an attribute, stored in a memory 118 of the RFID token 106 to be read out, is thus formed by the RFID interface 188 and the processor 189.

The user computer system 100 has a power supply circuit 191. The memory card interface 183 is preferably connected to this power supply circuit 191 so that the RFID card 107 is supplied with electrical energy via the memory card interface 187, in particular for RFID communication with the RFID token 106.

The RFID read command 184 is generated during operation, for example by executing the program instructions 112, and is input into the driver program 180. The driver program 180 then generates a store command 192 to store the RFID read command 184 in accordance with the memory card protocol. This store command 192 is transmitted via the memory card interface 183 to the memory card interface 187 of the RFID card 107. The store command 192 is then processed by the program 190, the RFID read command 184 contained in the store command 192 being sent via the RFID interface 188 to the RFID token 106 in accordance with the RFID protocol so as to read the information from the memory 118.

The RFID token 106 then responds with an RFID response 193, such as what is known as a response APDU.

The RFID response 193 is processed by the program 190, the response APDU 193 being transmitted via the memory card interface 187 to the memory card interface 183 in accordance with the memory card protocol so that it can be further processed by execution of the program instructions 112.

To this end, the RFID card 107 preferably has an electronic memory 194 for buffering the RFID response 193. Once the RFID response 193 has been received, it is stored in the memory 194 by a store command 195 by means of the program 190, for example in accordance with the memory card protocol. The RFID response 193 is then read out from the memory 194 via the memory card interfaces 183 and 187 by means of a read command 196 in accordance with the memory card protocol of the driver program 180.

The read command 196 can be sent by the program 180, for example after a predefined period of time after the store command 192. Alternatively, it may be signaled by means of the RFID card 107 via the memory card interface 187, for example by means of a bus signal, that the RFID response 193 has been stored in the memory 194, whereupon the read command 196 is then generated. By way of example, the memory card interfaces 183 and 187 may be coupled to one another by a data bus, such as a USB bus, via which the bus signal can be transmitted.

It is particularly advantageous in this case that the application program formed by the program instructions 112 can be used without modification, that is to say there is no need for any adaptation of the application program to the user computer system 100, which does not have an RFID interface. This is made possible because a virtual RFID interface 104 is formed by the driver program 180 and the memory card reader 182 and has the same functionality as a conventional RFID interface, and therefore the user computer system 100 actually appears to have an RFID interface from the perspective of the application program.

In this case, it is also of particular advantage that the user computer system 100 can be equipped for RFID communication merely by replacing a conventional memory card with the RFID card 107 and installing the driver program 180.

Figure 2:
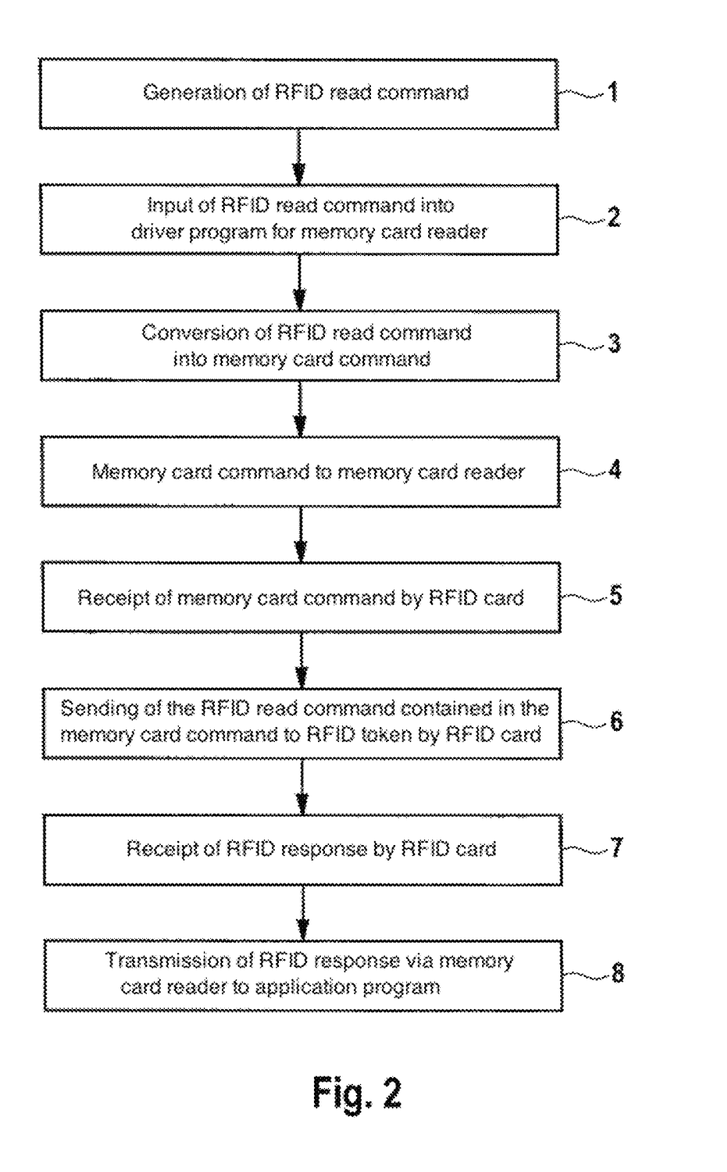
FIG. 2 shows a flow diagram of an embodiment of a method according to the invention.

FIG. 2 shows an embodiment of a method according to the invention. In step 1 an RFID read command is generated in accordance with an RFID protocol, for example by the application program of the electronic device, for example the user computer system 100. In step 2, this RFID read command is input into the driver program for the memory card reader. In step 3, this driver program converts the RFID read command into a memory card command in accordance with a memory card protocol, for example by generating a store command to store the RFID read command.

This memory card command is then transmitted in step 4 from the driver program to the memory card reader so that the RFID card receives the store command from the memory card reader in step 5. The RFID card then sends the RFID read command contained in the memory card command to the RFID token in step 6 and receives an RFID response from the RFID token in step 7. This RFID response is then transmitted in step 8 from the RFID card to the application program, for example via the memory card reader.

Figure 3:
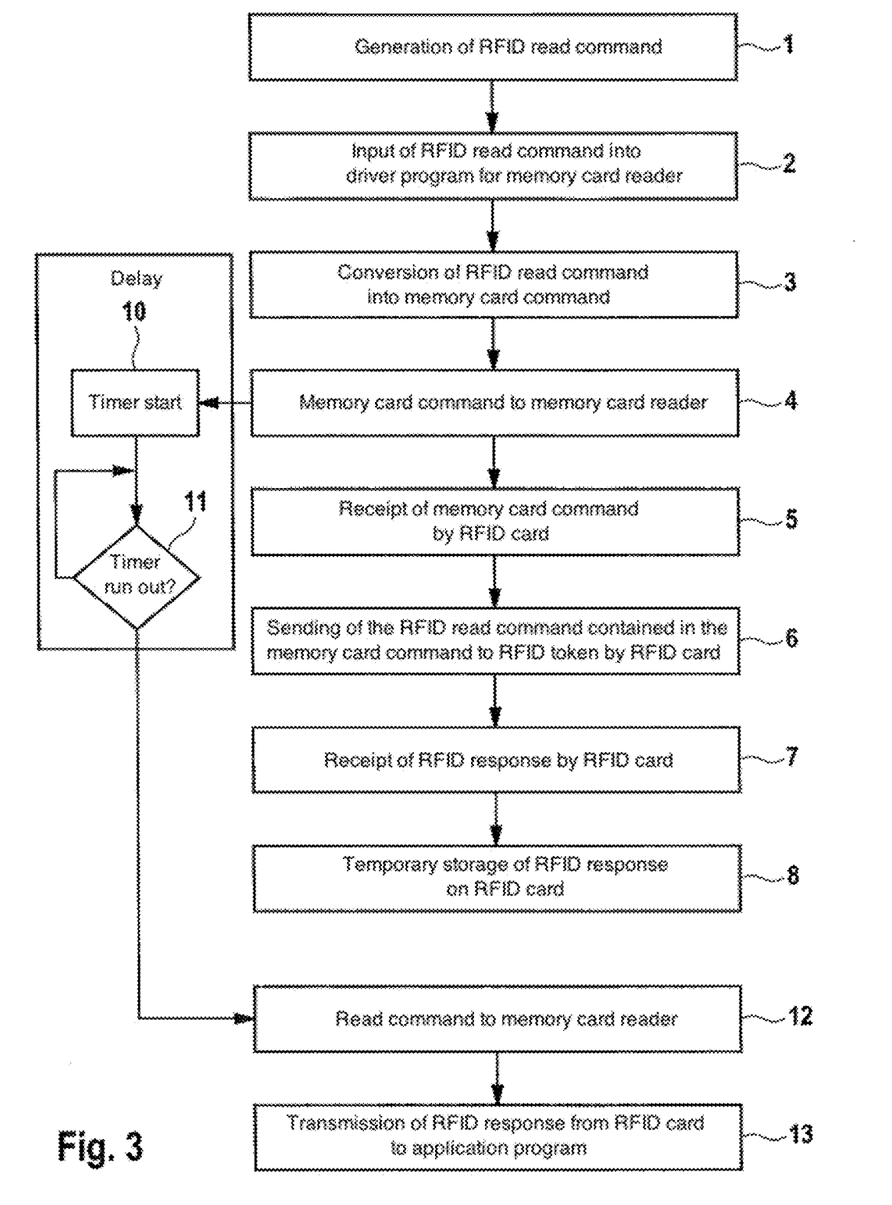
FIG. 3 shows a flow diagram of a further embodiment of a method according to the invention.

FIG. 3 shows a further embodiment of a method according to the invention, wherein steps 1 to 7 can be identical to steps 1 to 7 of FIG. 2.

In step 9, the RFID response is stored temporarily on the RFID card so that the RFID response can be read out from the RFID card by a read command. For this purpose, it is necessary for the read command to only be directed to the RFID card in accordance with the memory card protocol once the RFID response has been stored.

In order to ensure this timing of the read command, a timer may be started in step 10 on the basis of the RFID read command by the user computer system. By way of example, the timer may be started once the memory card command has been output to the memory card reader in step 4 or at an earlier moment in time, for example even in steps 1, 2 or 3, wherein the duration of the timer is to be selected so as to be longer accordingly.

When, in step 11, the user computer system establishes that the timer has run out, the read command is then directed to the memory card reader in step 12 so as to read the RFID response stored on the RFID card. In step 13, the RFID response is then transmitted from the RFID card to the user computer system so that the RFID response can be further processed for example by the application program of the user computer system. Depending on a result of the further processing, the application program generates a further RFID read command, that is to say the sequence control system then returns to step 1.

Steps 10 and 11 may be implemented in the driver program for example (see FIG. 1).

Alternatively, the read command may also be delayed if, in step 9, the RFID card signals the storage of the RFID response to the user computer system, whereupon the read command is then generated.

Figure 4:
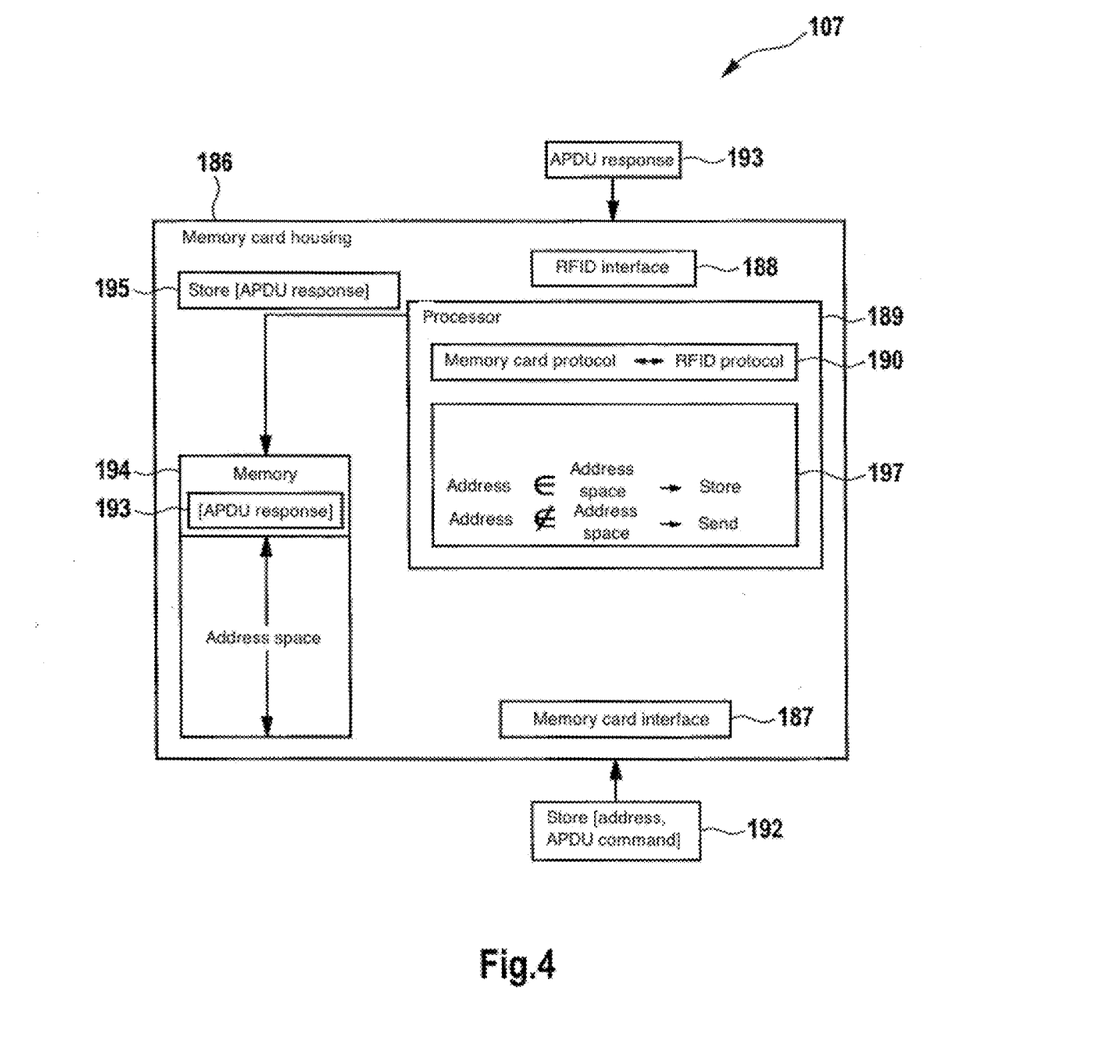
FIG. 4 shows a block diagram of an embodiment of an RFID card according to the invention.

FIG. 4 shows an embodiment of the RFID card 107, which is additionally formed as a memory card, for example as an SD memory card. To this end, the memory has a predefined address space, which can be accessed via the memory card interface 187, as is conventional to write and read data. The memory 194 additionally has a memory area outside this address space, which is used as a buffer memory for RFID communication with the RFID token 106 (see FIG. 1).

In this case, the processor 189 is used to execute program instructions 197, which implement a decision logic.

When a store command 192 reaches the RFID card 107 via the memory card interface 187 thereof, it is thus checked, by executing the program instructions 197, whether or not the address specified in the store command 192 is present within the address space. If the address in the store command 192 is present within the address space, the user data of the store command 192 are thus stored within this address space of the memory 194. If not, the store command 192 is thus interpreted as a command to send the user data of the store command 192, in this case therefore of the RFID read command 184, and therefore the RFID read command 184 is sent via the RFID interface 188. To this end, the RFID read command 184 may be buffered outside the predefined address space of the memory 194.

Accordingly, an RFID response 193 received by the RFID interface 188 is stored by the program 190 in the electronic memory 194 outside this address space by means of a store command 195. With a subsequent read command of the memory card reader, which specifies an address outside this address space, the RFID response 193 is read out form the memory 194. The memory 194 is thus divided into a memory area for reading and storing data with the freely addressable predefined address space and a buffer memory area outside this address space for RFID communication.

This has the specific advantage that the user can use the RFID card not only for RFID communication, but also as a memory card. The driver program 180 (see FIG. 1) is formed accordingly since an address outside the predefined address space is specified in the store command 192 or no address is specified.

Figure 5:
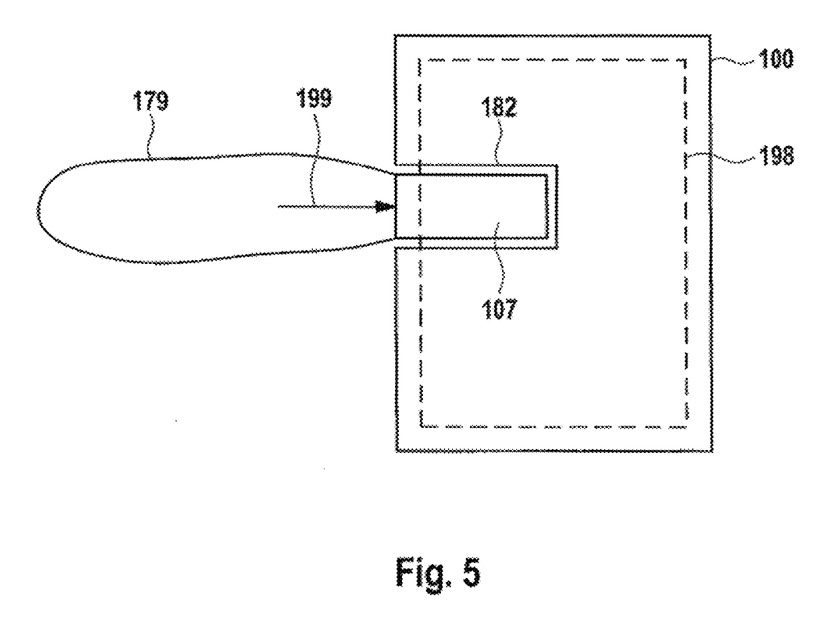
FIG. 5 shows a block diagram of an embodiment of an electronic device with an RFID card introduced into the memory card reader.

FIG. 5 shows a schematic diagram of an embodiment of the user computer system 100 with a printed circuit board 198, which carries a printed circuit and electronic components. The memory card reader 182 of the user computer system 100 forms a cavity in the housing of the user computer system 100, the RFID card being insertable into the cavity similarly to a conventional memory card by being pressed into this cavity by the user in the arrow direction 199.

In this case, the RFID antenna of the RFID interface 188 (see FIGS. 1 and 4) has an antenna lobe 179, which is directed away from the printed circuit board 198 since the printed circuit board 198 constitutes a shield with respect to the RFID signals to be sent and received by the RFID antenna, thus leading to attenuation of the signals to be sent and received. In the embodiment considered in this instance, the antenna lobe 179 is oriented in a manner protruding from the housing of the user computer system 100 approximately in the direction of insertion 199 so that no attenuation can be caused by the printed circuit board 198.

Figure 6:
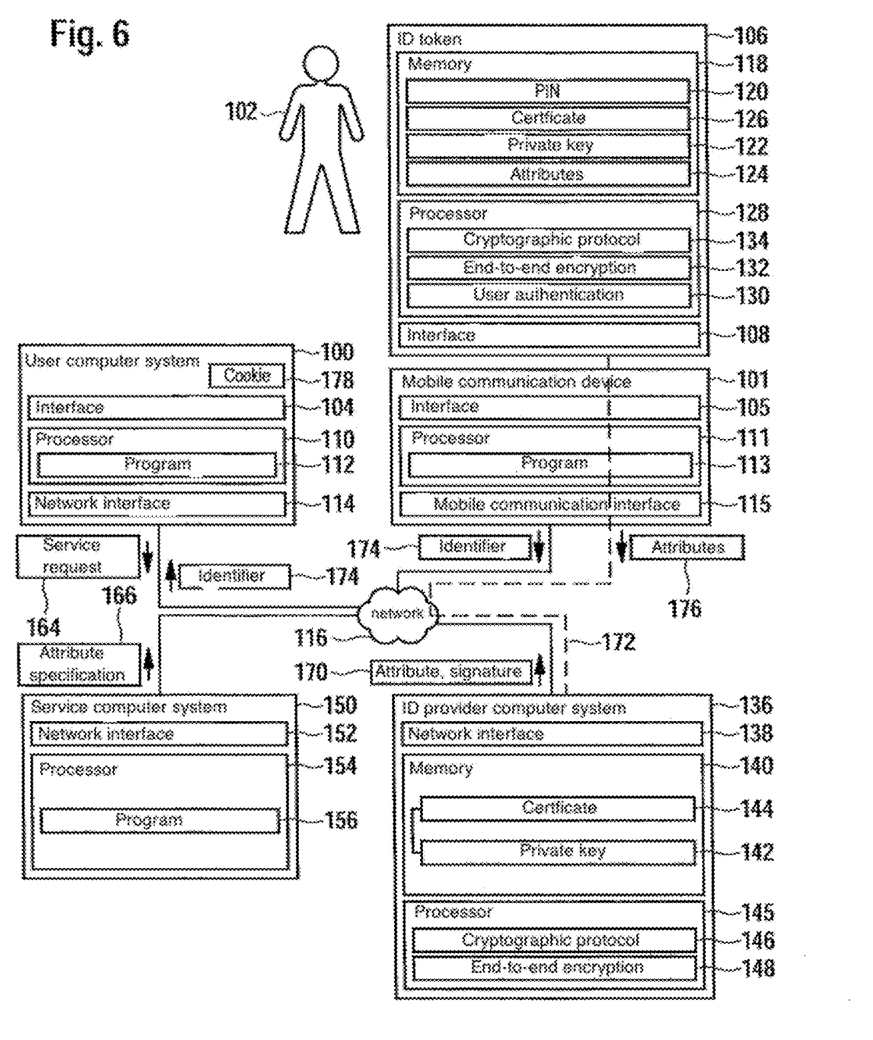
FIG. 6 shows a block diagram of a first embodiment of computer systems according to the invention.

FIG. 6 shows a further embodiment of a user computer system 100 of a user 102. The user computer system 100 has a virtual RFID interface 104 for communication with an RFID token 106, which has a corresponding interface 108; this can be formed as in the embodiment according to FIGS. 1 to 5.

The user computer system 100 has at least one processor 110 for executing program instructions 112 as well as a network interface 114 for communication via a network 116. The program instructions 112 may contain the driver program 180. The network 116 may be a computer network, such as the Internet. The network 116 contains a mobile communication network or is connected to a mobile communication network.

The RFID token 106 has an electronic memory 118 with protected memory areas 120, 122 and 124. The protected memory area 120 is used to store a reference value, which is required for authentication of the user 102 to the RFID token 106. By way of example, this reference value is what is known as a personal identification number (PIN), or reference data for a biometric feature of the user 102, which can be used for authentication of the user to the RFID token 106.

The protected area 122 is used to store a private key and the protected memory area 124 is used to store attributes, for example of the user 102, such as the users name, place of residence, date of birth, sex, and/or attributes concerning the RFID token itself, such as the institution that produced or issued the RFID token, the period of validity of the RFID token, or an identifier of the RFID token, such as a passport number or a credit card number.

The electronic memory 118 may also have a memory area 126 for storing a certificate. The certificate contains a public key which is associated with the private key stored in the protected memory area 122. The certificate may have been produced on the basis of a public key infrastructure (PKI) standard, for example on the basis of the X.509 standard.

The certificate does not necessarily have to be stored in the electronic memory 118 of the RFID token 106. Alternatively or in addition, the certificate may also be stored in a public directory server.

The RFID token 106 has a processor 128. The processor 128 is used for executing program instructions 130, 132 and 134. The program instructions 130 are used for user authentication, that is to say for authenticating the user 102 to the RFID token.

FIG. 6 also shows a mobile communication device 101 of the user 102. The mobile communication device 101 may be a mobile telephone or a smartphone for example. The mobile communication device 101 has an interface 105 for communication with the corresponding interface 108 of the RFID token 106. The interfaces 104, 105 and 108 may be interfaces for what is known as near field communication. The interface 105 may in turn be formed similarly to the interface 104 as a virtual RFID interface and the program instructions 113 may contain the driver program 180. An RFID card 107 may be located in the interfaces 104 and/or 105.

The mobile communication device 101 has at least one processor 111 for executing program instructions 113 and a mobile communication interface 115 for communication via the network 116.

In an embodiment using PINs, the user 102 inputs his PIN, in order to authentic himself, into the RFID token 106, for example via the mobile communication device 101. By way of example, the user 102 inputs his PIN via a keyboard of the mobile communication device 101; the PIN is then transmitted from the mobile communication device 101, via the interface 105, to the RFID token 106.

By executing the program instructions 130, the RFID token 106 then accesses the protected memory area 120 in order to compare the input PIN with the reference value of the PIN stored there. If the input PIN matches the reference value of the PIN, the user 102 is deemed to have been authenticated.

Alternatively, a biometric feature of the user 102 is captured. By way of example, the RFID token 106 has a fingerprint sensor for this purpose, or a fingerprint sensor is connected to the mobile communication device 101 or integrated therein. The biometric data captured from the user 102 are compared with the biometric reference data stored in the protected memory are 120 by executing the program instructions 130 in this embodiment. If there is a sufficient match between the biometric data captured from the user 102 and the biometric reference data then the user 102 is deemed to have been authenticated.

The program instructions 134 are used for executing the steps of a cryptographic protocol which relate to the RFID token 106 in order to authenticate an ID provider computer system 136 to the RFID token 106. The cryptographic protocol may be a challenge/response protocol based on a symmetric key or on an asymmetric key pair.

By way of example, the cryptographic protocol implements an extended access control method, as is specified for machine-readable travel documents (MRTDs) by the international aviation authority (ICAO). Successful execution of the cryptographic protocol authenticates the ID provider computer system 136 to the RFID token, thus proving its read authorization for reading the attributes stored in the protected memory area 124. The authentication may also be reciprocal, that is to say the RFID token 106 then also needs to authenticate itself to the ID provider computer system 136 on the basis of the same or a different cryptographic protocol.

The program instructions 132 are used for the end-to-end encryption of data transmitted between the RFID token 106 and the ID provider computer system 136, but at least of the attributes read by the ID provider computer system 136 from the protected memory area 124. For the end-to-end encryption, it is possible to use a symmetric key which is agreed between the RFID token 106 and the ID provider computer system 136 when the cryptographic protocol is executed, for example.

The ID provider computer system 136 has a network interface 138 for communication via the network 116. The ID provider computer system 136 also has a memory 140 which stores a private key 142 for the ID provider computer system 136 and also the appropriate certificate 144. This certificate may also be a certificate based on a PKI standard, for example, such as X.509.

The ID provider computer system 136 also has at least one processor 145 for executing program instructions 146 and 148. By executing the program instructions 146, the steps of the cryptographic protocol which relate to the ID provider computer system 136 are executed. Overall, the cryptographic protocol is thus implemented through execution of the program instructions 134 by the processor 128 of the RFID token 106 and also through execution of the program instructions 146 by the processor 145 of the ID provider computer system 136.

The program instructions 148 are used to implement the end-to-end encryption on the ID provider computer system 136, for example on the basis of the symmetric key which has been agreed between the RFID token 106 and the ID provider computer system 136 when the cryptographic protocol is executed. In principle, it is possible to use any method for agreeing the symmetric key for the end-to-end encryption which is known per se beforehand, such as a Diffie-Hellman key exchange.

The ID provider computer system 136 is preferably situated in a particularly protected environment, particularly in what is known as a trust center, so that the ID provider computer system 136 forms the confidence anchor for the authenticity of the attributes read from the RFID token 106 in combination with the need for authentication of the user 102 to the RFID token 106.

A service computer system 150 may be designed to take an order or a commission for a service or a product, particularly an online service. By way of example, the user 102 can open an account at a bank or use another financial or banking service online via the network 116. The service computer system 150 may also be in the form of an online warehouse, so that the user 102 can purchase a mobile telephone or the like online, for example. In addition, the service computer system 150 may also be designed to deliver digital content, for example for the download of music data and/or video data.

To this end, the service computer system 150 has a network interface 152 for connection to the network 116. In addition, the service computer system 150 has at least one processor 154 for executing program instructions 156. Execution of the program instructions 156 generates dynamic HTML pages for example, which the user 102 can use to input his commission or his order.

Depending on the nature of the commissioned or ordered product or the service, the service computer system 150 needs to check one or more attributes of the user 102 and/or of his RFID token 106 using one or more prescribed criteria. Only if this check is passed is the order or the commission from the user 102 taken and/or performed.

By way of example, opening a bank account or purchasing a mobile telephone with an associated contract requires the user 102 to disclose his identity to the service computer system 150 and requires this identity to be checked. In the prior art, the user 102 must do this by presenting his identification card, for example. This process is replaced by the reading of the digital identity of the user 102 from his RFID token 106.

Depending on the instance of application, however, the user 102 does not need to disclose his identity to the service computer system 150, but rather it suffices to communicate only one of the attributes, for example. By way of example, the user 102 can use one of the attributes to provide evidence that he belongs to a particular group of people which is authorized to access data held on the service computer system 150 for download. By way of example, such a criterion may be a minimum age of the user 102 or the association of the user 102 with a group of people which has access authorization for particular confidential data.

To use the service provided by the service computer system 150, the procedure is as follows:

1 Authentication of the user 102 to the RFID token 106.

The user 102 authenticates himself to the RFID token 106. In an implementation using PINs, the user 102 does this by inputting his PIN into the RFID token 106, for example via the user computer system 100 or the mobile communication device 101. By executing the program instructions 130, the RFID token 106 then checks the correctness of the input PIN. If the input PIN matches the PIN's reference value stored in the protected memory area 120, the user 102 is deemed to have been authenticated. The procedure may be similar if a biometric feature of the user 102 is used to authenticate him, as described above.

2. Authentication of the ID provider computer system 136 to the RFID token 106.

To this end, a protected connection 172 is set up between the RFID token 106 and the ID provider computer system 136 via a network connection, in particular a mobile communication connection, and via the interfaces 105 and 108. A mobile IP protocol, more specifically according to the standard of the Internet Engineering Task Force (IETF), can be used for example to set up the mobile communication connection between the mobile communication device 101 and the ID provider computer system 136 via the network 116. In particular, the mobile communication device 101 may have a web browser or another TCP/IP-capable application, which is used to set up the mobile communication connection. The protected connection 172 is shown in FIG. 1 as a dashed line.

By way of example, the ID provider computer system 136 transmits its certificate 144 via this connection 172 to the RFID token 106. The program instructions 134 then generate what is known as a challenge, that is to say a random number, for example. This random number is encrypted using the public key of the ID provider computer system 136, which is contained in the certificate 144. The resulting cipher is sent from the RFID token 106 via the connection 172 to the ID provider computer system 136. The ID provider computer system 136 decrypts the cipher using its private key 142 and in this way obtains the random number. The random number is returned by the ID provider computer system 136 to the RFID token 106 via the connection 172. By executing the program instructions 134, said RFID token checks whether the random number received from the ID provider computer system 136 matches the originally generated random number, that is to say the challenge. If this is the case, the ID provider computer system 136 is deemed to have been authenticated to the RFID token 106. The random number can be used as a symmetric key for the end-to-end encryption.

3. When the user 102 has successfully authenticated himself to the RFID token 106, and when the ID provider computer system 136 has successfully authenticated itself to the RFID token 106, the ID provider computer system 136 is provided with read authorization for reading an attribute, a plurality of attributes or all of the attributes stored in the protected memory area 124. On the basis of a relevant read command which the ID provider computer system 136 sends to the RFID token 106 via the connection 172, the requested attributes are read from the protected memory area 124 and they are encrypted by executing the program instructions 132. The encrypted attributes are transmitted via the connection 172 to the ID provider computer system 136, where they are decrypted by executing the program instructions 148. This provides the ID provider computer system 136 with knowledge of the attributes read from the RFID token 106.

These attributes are signed by the ID provider computer system using its certificate 144 and are transmitted via the user computer system 100 or directly to the service computer system 150. This notifies the service computer system 150 of the attributes read from the RFID token 106, so that the service computer system 150 can check these attributes using the prescribed one or more criteria so as then possibly to provide the service requested by the user 102.

The need to authenticate the user 102 to the RFID token 106 and to authenticate the ID provider computer system 136 to the RFID token 106 provides the necessary confidence anchor, so that the service computer system 150 can be certain that the attributes of the user 102 which have been communicated to it by the ID provider computer system 136 are correct and not falsified.

Depending on the embodiment, the order of the authentication may be different. By way of example, provision may be made for the user 102 to have to authenticate himself to the RFID token 106 first of all, followed by the ID provider computer system 136. In principle, however, it is also possible for the ID provider computer system 136 to have to authenticate itself to the RFID token 106 first of all, followed only then by the user 102.

In the first case, the RFID token 106 is designed, by way of example, such that it is unlocked only through input of a correct PIN or a correct biometric feature by the user 102. Only this unlocking allows the program instructions 132 and 134 to start and hence the ID provider computer system 136 to be authenticated.

In the second case, it is also possible to start the program instructions 132 and 134 even when the user 102 has not yet authenticated himself to the RFID token 106. In this case, by way of example, the program instructions 134 are in a form such that the ID provider computer system 136 cannot perform read access to the protected memory area 124 for the purpose of reading one or more of the attributes until after the program instructions 130 have signaled that the user 102 has also been successfully authenticated.

Of particular advantage is the utilization of the RFID token 106 for e-commerce and e-government applications, for example, specifically without media disruption and legally on the basis of the confidence anchor formed by the need for the user 102 and the ID provider computer system 136 to be authenticated to the RFID token 106. Of particular advantage is also the fact that central storage of the attributes of various users 102 is not necessary, which means that the data protection problems which exist in the prior art are solved hereby. As far as the convenience of the application of the method is concerned, it is of particular advantage that prior registration of the user 102 in order to use the ID provider computer system 136 is not necessary.

The ID provider computer system 136 is preferably designed for use by a multiplicity of users. In this case, the user computer system 100 of the user 102 is associated with the mobile communication device 101 of said user 102 so that the ID provider computer system 136 sends the attributes read from the RFID token 106 of the user 102 to the user computer system 100 of this user 102 and not to another user.

The following approach is adopted for example in order to produce such an association:

A service request 164 is first sent via the network 116 from the user computer system 100 to the service computer system 150. The service computer system 150 responds to the service request 164 with the request of at least one attribute of the user 102 of the user computer system 100, for example that is to say with an attribute specification 166. The service computer system 150 sends this attribute specification 166 to the user computer system 100 via the network 116.

A first connection is then set up between the user computer system 100 and the ID provider computer system 136 via the network 116, for example as a result of the user 102 inputting the URL of the ID provider computer system 136 into a browser program of the user computer system 100. The attribute specification 166 is then sent in the form of a message via this first connection from the user computer system 100 to the ID provider computer system 136.

The ID provider computer system 136 then generates an identifier, which is associated with the user computer system 100. The identifier may be a unique identifier such as a GUID or a key, for example a symmetric or asymmetric key. The ID provider computer system 136 sends such an identifier 174 back to the user computer system 100 via the first connection.

The identifier 174 is then transmitted from the user computer system 100 to the mobile communication device 101. By way of example, the user computer system 100 sends the identifier 174 from its interface 104 to the corresponding interface 105 of the mobile communication device 101 for this purpose.

A mobile communication connection is then set up via the network 116 from the mobile communication device 101 to the ID provider computer system 136, for example as a result of the user 102 of the mobile communication device 101 inputting the URL of the ID provider computer system 136 into a web browser program of the mobile communication device 101, which is formed by the program instructions 112. A second connection is thus produced by the mobile communication connection.

The mobile communication device 101 sends the identifier 174 to the ID provider computer system 136 via the second connection. Since this identifier 174 is identical to the identifier 174 associated with the user computer system 100, the ID provider computer system 136 sets up the protected connection 172 with the aid of this second connection so as to read out the attribute(s) 176 specified in the attribute specification 166 from the RFID token 106.

Once the ID provider computer system 136 has received the attributes 176 from the RFID token 106 via the protected connection 172, it thus signs this attribute 176 with the aid of its certificate 144. The ID provider computer system 136 then sends a response 170 to the user computer system 100 via the first connection, wherein the response contains the attributes 176 and the signature thereof. The response 170 may also comprise a signature of the identifier 174 and/or the identifier 174 itself and/or a signature formed by interlinking the attributes 176 and the identifier 174.

The response 170 can then be forwarded from the user computer system 100 to the service computer system 150, which thus obtains knowledge in a trustworthy manner of the attributes and possibly the identifier specified in the attribute specification 166 and can then provide the service specified in the service request 164.

Alternatively, the response 170 may also be transmitted directly from the ID provider computer system 136 to the service computer system 150 via the network 116.

According to an embodiment, the identifier 174 is stored in a non-volatile memory of the user computer system 100, such as in a hard disc memory of the user computer system 100, for example in the form of what are known as cookies 178. The response 170 is also stored in a non-volatile memory of the service computer system 150.

If the user 102 later again directs a further service request 164 to the service computer system 150 by means of his user computer system 100, the service computer system 150 can thus access the cookie 178 via the network 116 and thus read out the identifier 174 from the user computer system 100. If this identifier is also part of the response 170, which is stored in the service computer system 150, the service computer system 150 then already possesses the attributes necessary to provide the desired service for the user 102 since it can associate this stored response with the user 102 via the identifier.

According to an embodiment of the invention, the identifier 174 has limited validity with regard to the term or number of uses of the stored response 170. The maximum validity of the identifier 174 may be provided in the response 170, for example in the form of an expiry date. Once this expiry date has been reached or is exceeded, the service computer system 150 can no longer use the response stored in the service computer system 150, and has to respond to a subsequent further service request 164 with the attribute specification 166, such that the above-described process for reading out the attribute(s) from the RFID token 106 is carried out again.

Instead of the user computer system 100 and the mobile communication device 101, the respective functions can also be implemented in a single electronic device, for example in what is known as a smartphone or another network-capable device. A different network connection may then also be used for communication instead of a mobile communication connection.

Figure 7:
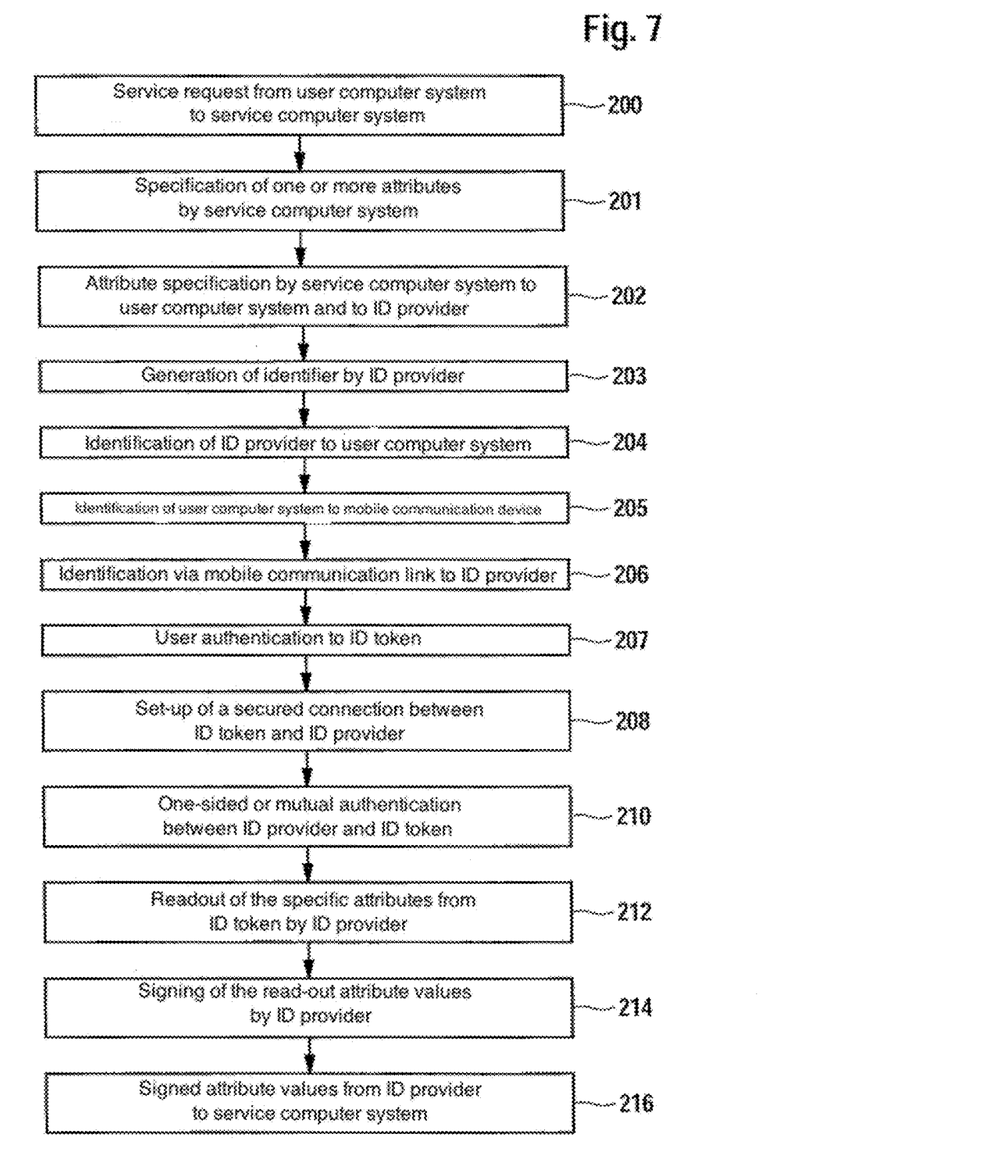
FIG. 7 shows a flow diagram of an embodiment of a method according to the invention.

FIG. 7 shows an embodiment of a method according to the invention. In step 200, a service request is sent from the user computer system to the service computer system. To this end, the user starts an Internet browser of the user computer system for example and inputs a URL to call a web page on the service computer system. The user then inputs his service request into the called web page, for example an order or request for a service or a product.

In step 201, the service computer system 150 then specifies one or more attributes, which it requires in order to check the user's authorization for the service request. In particular, the service computer system may specify attributes that determine the digital identity of the user 102. This specification of the attributes by the service computer system 150 may be predefined in a fixed manner or can be determined by the service computer system 150 on the basis of predefined rules depending on the service request in the individual case.

In step 202, the attribute specification, that is to say the specification of the one or more attributes carried out in step 201, is transmitted from the service computer system to the ID provider computer system, more specifically either directly or via the user computer system.

By way of example, the user computer system receives the attribute specification from the service computer system and then sets up a first connection to the ID provider computer system via the network. The user computer system then sends the attribute specification to the ID provider computer system via the first connection. In step 203, the ID provider computer system then generates an identifier, which it associates with the user computer system from which it has obtained the attribute specification. This association is stored by the ID provider computer system. In step 204, the identifier is sent from the ID provider computer system to the user computer system, for example via the first connection, which for example may be formed as what is known as a session.

In step 205, the identifier is transmitted from the user computer system to the mobile communication device. This can occur automatically, for example via NFC communication between the user computer system and the mobile communication device or over a different communication channel, for example optically. By way of example, the identifier is displayed on a monitor of the user computer system and is captured optically by a camera of the mobile communication device.

In step 206, a mobile communication connection is set up between the mobile communication device and the ID provider computer system, and the identifier is transmitted from the mobile communication device to the ID provider computer system via the mobile communication connection. Since the identifier, which the ID provider computer system receives in step 206 via the mobile communication connection, is identical to the identifier generated in step 203 and associated with the user computer system, the mobile communication connection and the RFID token that can be read out from the ID provider computer system via the mobile communication connection are likewise associated with the user computer system and the user thereof.

In order to provide the ID provider computer system with the opportunity to read attributes from his RFID token, the user authenticates himself to the RFID token in step 207.

In step 208, a protected connection is set up between the RFID token and the ID provider computer system (see connection 172 in FIG. 1). This is preferably a connection with end-to-end encryption in this case, for example on the basis of what is known as a secure messaging method.

In step 210, the ID provider computer system is at least authenticated to the RFID token via the protected connection which has been set up in step 208. In addition, there may also be provision for the RFID token to be authenticated to the ID provider computer system.

When both the user and the ID provider computer system have been successfully authenticated to the RFID token, the ID provider computer system is provided with the access authorization for reading the attributes by the RFID token. In step 212, the ID provider computer system sends one or more read commands for reading the attributes required according to the attribute specification from the RFID token. The attributes are then transmitted using end-to-end encryption via the protected connection to the ID provider computer system, where they are decrypted.

The attribute values which have been read are signed by the ID provider computer system in step 214. In step 216, the ID provider computer system sends the signed attribute values via the network. The signed attribute values reach the service computer system either directly or via the user computer system. In the latter case, the user may have the opportunity to take note of the signed attribute values and/or to add further data to them. Provision may be made for the signed attribute values, possibly with the added data, to be forwarded from the user computer system to the service computer system only following release by the user. This provides the greatest possible transparency for the user in terms of the attributes sent from the ID provider computer system to the service computer system.

In addition, the identifier can also be signed by the ID provider computer system in step 214 and can be sent via the network to the service computer system or the user computer system in step 216.

Figure 8:
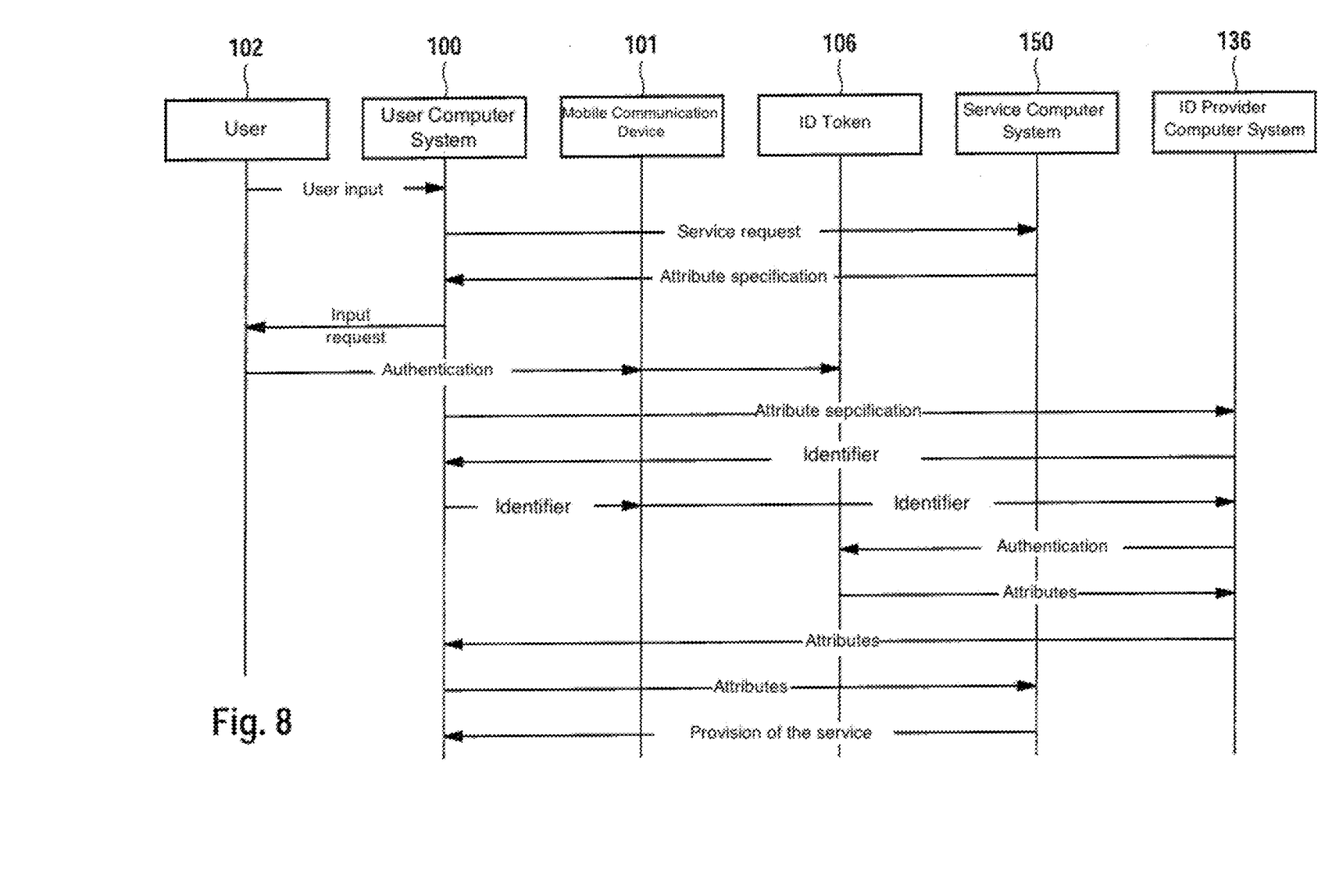
FIG. 8 shows a UML diagram of a further embodiment of a method according to the invention.

FIG. 8 shows a further embodiment of a method according to the invention. A user input from a user 102 into a user computer system 100 is used by the user 102 to specify a service on a service computer system which he or she wishes to use. By way of example, this is done by calling an Internet page on the service computer system and selecting one of the services provided thereon. The service request from the user 102 is transmitted from the user computer system 100 to the service computer system 150.

The service computer system 150 responds to the service request with an attribute specification, that is to say for example a list of attribute names. Once the attribute specification has been received, the user computer system 100 asks the user 102 to authenticate himself to the RFID token 106, for example by means of an input request.

The user then switches on his mobile communication device 101 and authenticates himself firstly to his mobile communication device 101. The user 102 then authenticates himself to the RFID token 106, for example by inputting his PIN into a keyboard of the mobile communication device 101. The mobile communication device 101 transmits the PIN input by the user 102 from its interface 105 (see FIG. 6) to the RFID token 106.

The attribute specification is forwarded from the user computer system 100 to an ID provider computer system 136. The ID provider computer system 136 then generates an identifier, which associates the ID provider computer system with the user computer system 100, and sends it to the user computer system 100. The association of the identifier with the user computer system 100 is stored by the ID provider computer system 136.

The identifier is then transmitted from the user computer system 100 to the mobile communication device 101. This can occur manually as a result of the user 102 reading off the identifier displayed on a display of the user computer system 100 and inputting it via a keyboard of the mobile communication device 101 into the mobile communication device 101. The transmission can also take place in a fully automated manner without the involvement of the user 102, or in a partly automated manner, more specifically for example by radio transmission of the identifier from the user computer system 100 to the mobile communication device 101 via the network 116 (see FIG. 6) or via an NFC communication connection, which is set up between the user computer system 100 and the mobile communication device 101.

Furthermore, the identifier may also be transmitted optically between the user computer system and the mobile communication device 101, for example by optically capturing, with the aid of a camera of the mobile communication device 101, the identifier displayed in plain text on the display of the user computer system 100 or the identifier displayed in the form of a 2D barcode.

A mobile communication connection, via which the identifier is transmitted from the mobile communication device 101 to the ID provider computer system 136, is set up between the mobile communication device 101 and the ID provider computer system 136. Due to the association stored in the ID provider computer system 136 of the identifier with user computer system 100, this mobile communication connection is therefore also associated with the user computer system 100.

The ID provider computer system 136 then communicates with the RFID token 106 via the mobile communication connection and the mobile communication device 101 in order to authenticate itself to the RFID token 106 and in order to direct to the RFID token 106 a read request to read the attributes in accordance with the attribute specification.

Assuming the prior successful authentication of the user 102 and of the ID provider computer system 136, the RFID token 106 responds to the read request with the desired attributes. The ID provider computer system 136 signs the attributes and sends the signed attributes to the user computer system 100. Following release by the user 102, the signed attributes are then transmitted to the service computer system 150, which can then provide the desired service as appropriate.

In addition to the attributes, the ID provider computer system 136 can also sign the identifier and send it to the user computer system 100 together with the signed attributes.

Figure 9:
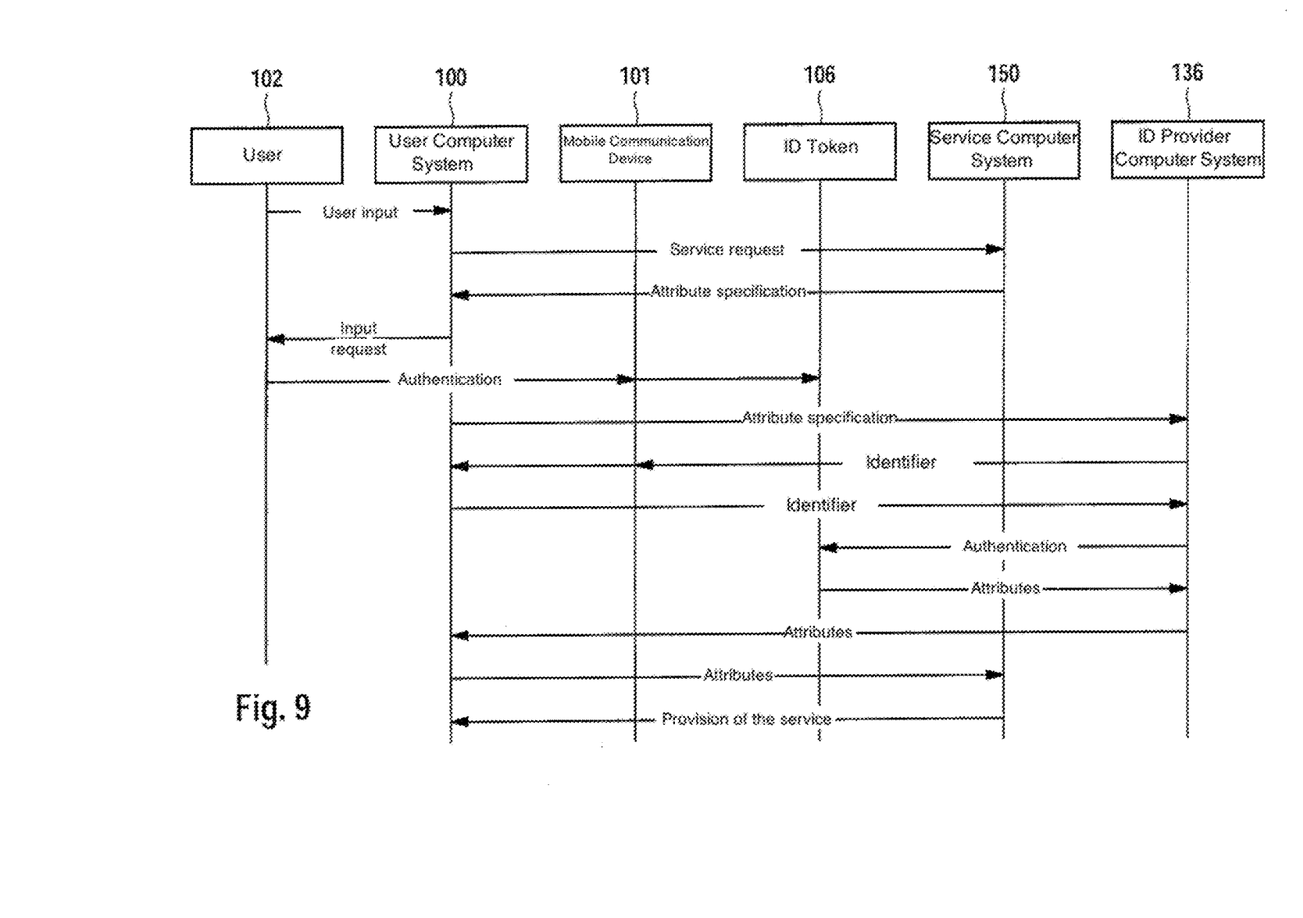
FIG. 9 shows a UML diagram of a further embodiment of a method according to the invention.

FIG. 9 shows a further embodiment of a method according to the invention. The embodiment in FIG. 9 differs from the embodiment according to FIG. 8 in particular in that the ID provider computer system 136 does not send the identifier, which it generates after receipt of the attribute specification by the user computer system 100, to the user computer system 100, but to the mobile communication device 101. The identifier is then transmitted from the mobile communication device 101 to the user computer system 100, more specifically again either manually by the user 102 or automatically or partly automatically, for example via a radio channel or an optical channel.

The user computer system 100 then sends the identifier to the ID provider computer system 136 so that the mobile communication connection arranged between the mobile communication device 101 and the ID provider computer system 136 and associated with the identifier is also associated with the user computer system 100.

In a further variant, it is possible for the attribute specification to be transmitted from the user computer system 100 to the mobile communication device 101, more specifically manually or automatically, and for the attribute specification to be sent to the ID provider computer system 136 from the mobile communication device 101 instead of from the user computer system 100.

Furthermore, it is also possible for the ID provider computer system to transmit the identifier both to the mobile communication device 101 and to the user computer system 100. The identifier can then be transmitted selectively from the mobile communication device 101 to the user computer system 100 or in the other direction.

LIST OF REFERENCE SIGNS

- 100 user computer system
- 101 mobile communication device
- 102 user
- 104 interface
- 105 interface
- 106 RFID token
- 107 RFID card
- 108 interface
- 110 processor
- 111 processor
- 112 program instructions
- 113 program instructions
- 114 network interface
- 115 mobile communication interface
- 116 network
- 118 electronic memory
- 120 protected memory area
- 122 protected memory area
- 124 protected memory area
- 126 memory area
- 128 processor
- 130 program instructions
- 132 program instructions
- 134 program instructions
- 136 ID provider computer system
- 138 network interface
- 140 memory
- 142 private key
- 144 certificate
- 145 processor
- 146 program instructions
- 148 program instructions
- 149 program instructions
- 150 service computer system
- 152 network interface
- 154 processor
- 156 program instructions
- 158 configuration data record
- 160 configuration data record
- 161 configuration data record
- 162 user input
- 164 service request
- 166 attribute specification
- 168 request
- 170 response
- 172 connection
- 174 identifier
- 176 attribute
- 178 cookie
- 179 antenna lobe
- 180 driver program
- 182 memory card reader
- 183 memory card interface
- 184 RFID read command
- 185 RFID program interface
- 186 memory card housing
- 187 memory card interface
- 188 RFID interface
- 189 processor
- 190 program
- 191 power supply circuit
- 192 store command
- 193 RFID response
- 194 memory
- 195 store command
- 196 read command
- 197 program instructions
- 198 printed circuit board
- 199 arrow direction

The invention claimed is:

1. A method for reading an RFID token, comprising:
converting an RFID read command into a memory card command containing the RFID read command via an electronic device, the converting performed by a driver program that features a conversion routine for the transformation of an RFID protocol to a memory card protocol and vice versa, whereby the electronic device comprises an integrated memory card reader with a memory card interface,
transmitting the memory card command to an RFID card via the memory card reader, wherein the RFID card contains a memory card interface for the memory card reader, a processor for execution of a program for conversion of the memory card protocol to the RFID protocol and vice versa, and an RFID reader that can be addressed via the memory card interface,
sending the RFID read command contained in the memory card command from the RFID reader to the RFID token via an RFID read signal,
receiving an RFID response from the RFID token via the RFID reader,
transmitting the RFID response to the memory card reader of the electronic device via the memory card interface, where the RFID reader is formed by the processor and an RFID interface.

2. The method as claimed in claim 1, wherein the RFID read command is generated by an application program of the electronic device and the RFID response is processed by the application program.

3. The method as claimed in claim 1, wherein the RFID read command is converted into a write command of the memory card interface.

4. The method as claimed in claim 1, wherein the memory card interface is an SD memory card interface.

5. The method as claimed in claim 1, wherein the electronic device has at least one printed circuit and the memory card reader is integrated into a housing of the electronic device so that the printed circuit at least partially covers the memory card reader, and wherein the RFID card has an antenna, of which the antenna lobe is oriented in a direction of insertion of the memory card into the memory card reader, the antenna protruding from the housing of the electronic device when the RFID card is inserted into the memory card reader of the electronic device.

6. The method as claimed in claim 1, wherein the RFID response is buffered in a memory of the RFID card and is read out by a read command of the electronic device so as to input the RFID response into the application program.

7. The method as claimed in claim 6, wherein the receipt of the RFID response by the RFID card is signaled to the electronic device so as to thus trigger the read command of the electronic device.

8. The method as claimed in claim 6, wherein the read command is directed from the electronic device to the RFID card via the memory card interface once a predefined period has elapsed after transmission of the memory card command.

9. The method as claimed in claim 6, wherein the read command is directed from the electronic device to the RFID card via the memory card interface before a subsequent memory card command.

10. The method as claimed in claim 1, wherein a cryptographic protocol that relates to the electronic device is carried out by the application program in order to read out at least one attribute stored in RFID token, wherein, to carry out the cryptographic protocol, a plurality of RFID read commands are generated by the application program and are each converted into memory card commands by a driver program for the RFID card of the electronic device.

11. The method as claimed in claim 1 for reading at least one attribute stored in the RFID token, wherein the RFID token is associated with a user, and wherein the RFID token has an RFID interface, said method further comprising:
   authenticating the user to the RFID token,
   setting up a communication connection, in particular a mobile communication connection, between the electronic device, which in particular may be designed as a mobile communication device, and a first computer system, wherein the computer system has a first interface and the electronic device has a second interface, which contains the memory card interface,
   setting up a protected connection between the first computer system and the RFID token via the communication connection and via the first and second interfaces,
   authentication of the first computer system to the RFID token via the protected connection,
   granting the first computer system read access to the at least one attribute stored in the RFID token, following successful authentication of the user and the first computer system to the RFID token, in order to transmit the at least one attribute, once it has been signed, via a network, wherein, to carry out the read access, one or more RFID read commands are generated by the first computer system and/or the electronic device.

12. An RFID card comprising:
   a memory card interface for a memory card reader of an electronic device;
   an RFID interface;
   a processor coupled to the memory card interface and the RFID interface and configured, in operation, to convert a memory card protocol into an RFID protocol and vice versa;
   an RFID reader that can be addressed by the memory card interface, the RFID reader formed by the processor and the RFID interface; and
   a memory card housing, in which the memory card interface, the processor and the RFID reader are integrated,
   where the processor controls the RFID interface of the RFID card to send an RFID read command on the basis of the receipt of a memory card command to store the RFID read command.

13. The RFID card as claimed in claim 12, where an RFID interface generates an RFID signal to signal the receipt of the RFID response via the memory card interface.

14. An electronic device having a memory card reader selectively for a memory card or an RFID card as claimed in claim 12, and a processor configured in operation to convert an RFID read command of an RFID protocol into a store command of a memory card protocol, the store command containing the RFID read command.

15. An RFID card comprising:
   a memory card interface;
   an RFID interface for generating an RFID signal on the basis of an memory card store command received via the memory card interface, the memory card store command containing an RFID read command; and
   a memory for storing an RFID response received on the basis of the RFID read command, wherein the memory can be accessed via the memory card interface by a memory card read command.

\* \* \* \* \*